United States Patent [19]

Harney et al.

[11] 4,297,377

[45] Oct. 27, 1981

[54] METHOD OF MAKING FRENCH FRYABLE FROZEN POTATO STRIPS

[75] Inventors: David L. Harney; Harlow S. Young, both of Othello, Wash.

[73] Assignee: Chef-Reddy Foods Corporation, Othello, Wash.

[21] Appl. No.: 126,708

[22] Filed: Mar. 3, 1980

Related U.S. Application Data

[63] Continuation of Ser. No. 6,099, Jan. 24, 1979, abandoned.

[51] Int. Cl.³ .......................... A23B 7/03; A23L 1/216
[52] U.S. Cl. .................................... 426/438; 426/444; 426/473; 426/520; 426/808
[58] Field of Search ............... 426/637, 438, 441, 443, 426/444, 455, 456, 464, 465, 473, 478, 518, 520, 523, 524, 808

[56] References Cited

U.S. PATENT DOCUMENTS

| | | | |
|---|---|---|---|
| 2,565,942 | 8/1951 | Barsky et al. | 426/637 X |
| 3,244,538 | 4/1966 | Kaehler | 426/438 |
| 3,359,123 | 12/1967 | Katvcki et al. | 426/637 X |
| 3,397,993 | 8/1968 | Strong | 426/441 |
| 3,649,305 | 3/1972 | Wilder | 426/637 X |
| 3,812,274 | 5/1974 | Weaver et al. | 426/438 |
| 3,973,047 | 8/1976 | Linaberry et al. | 426/456 X |
| 4,109,020 | 8/1978 | Gorfien et al. | 426/637 X |

Primary Examiner—Arthur L. Corbin
Attorney, Agent, or Firm—Robert W. Beach; Douglas E. Winters; Ward Brown

[57] ABSTRACT

Raw, unblanched potato strips suitable for French frying are heated principally by circulation of hot air to dry their surfaces, and simultaneously to cook the strips partially and to dehydrate the strips partially. The strips are then frozen and stored in frozen condition until they are to be finally deep fat fried ready for consumption.

5 Claims, No Drawings

METHOD OF MAKING FRENCH FRYABLE FROZEN POTATO STRIPS

This is a continuation of application Ser. No. 6,099 filed Jan. 24, 1979, now abandoned.

BACKGROUND OF THE INVENTION

1. Field of the Invention

The present invention relates to frozen potato strips which are French fryable and to a method of preparing French fryable potato strips for freezing.

For producing quick-service French fried potatoes, it is important that a stock of French fryable potato strips be available to meet varying demands. Customers prefer to have French fried potatoes that have the texture, flavor and odor of freshly deep fat fried raw potatoes, but they do not want to wait to have such potatoes cooked. Consequently, it is desirable to be able to subject the potato strips to a very brief final heating or finish cooking while producing an attractive and palatable product.

The demand for French fried potato strips is not particularly seasonal, yet the growing of the potatoes from which they are made is seasonal. Consequently, it is necessary to utilize a practical method of preserving potatoes, or French fryable potato strips, for a considerable period of time, up to a year, and it is customary to accomplish such preservation of French fryable potato strips by freezing. A stock of frozen French fryable potato strips thus can be accumulated immediately following the potato growing season and the stock can be distributed as needed to meet the substantially constant demand for French fryable potato strips throughout the following year.

2. Prior Art

Frozen potato strips have been used for making quick-service French fried potatoes, but such French fried potatoes have generally not been of the best quality, having one or more of the characteristics of sogginess, pale color, lack of crispness, poor flavor, a leathery shell and an interior that is undercooked or pasty instead of being mealy throughout.

In some instances, prior to being frozen, potato strips have been blanched, as in Strong U.S. Pat. No. 3,397,993 and Wilder U.S. Pat. No. 3,649,305, or partially cooked in water, or partially deep fat fried, or partially dehydrated, or subjected to some combination of such process steps. Such French fryable strips often have not been of good quality.

The Katucki et al. U.S. Pat. No. 3,359,123 proposes to use heated air for partially cooking whole unpeeled potatoes prior to being frozen, but the potatoes are dehydrated after being frozen rather than prior to being frozen.

The potato strips of the Barskey et al. U.S. Pat. No. 2,565,942 are partially dried or cooked in water prior to being frozen.

The Kaehler U.S. Pat. No. 3,244,538 proposes to subject potato strips to a preliminary drying step using dry heat or superheated steam prior to the potatoes being frozen, but any cooking effect which occurs extends only to the exterior of the potato, leaving the interior substantially uncooked or raw.

SUMMARY OF THE INVENTION

It is an object of the present invention to provide a procedure for enabling French fryable potato strips to be prepared quickly and effectively for frozen storage while maintaining a high quality of such strips.

Moreover such frozen French fryable potato strips can be finally deep fat fried quickly for consumption.

A further object is to provide a method of preparing French fryable frozen potato strips which conserves energy by minimizing heat required to cook and/or dry such strips.

Despite the advantages of the process of preparing French fryable frozen potato strips according to the present invention, such strips when finally fried even without being thawed first have an appearance, texture, flavor and odor comparable to raw potato strips which have been French fried without having been frozen.

The foregoing objects can be accomplished by circulating hot air over French fryable, substantially raw potato strips and thereby partially cooking and partially dehydrating the potato strips prior to being frozen.

DETAILED DESCRIPTION

Potatoes of a variety known to be suitable for French frying and in suitable condition are sorted, peeled and trimmed in accordance with conventional practice and are then cut into strips of a size customarily used for French frying, such as of a width and thickness $\frac{1}{4}$ inch (6.35 mm) to $\frac{1}{2}$ inch (12.7 mm) and several inches (more than 10 cm) in length. After such strips are cut, they can be washed to remove surface starch.

French fryable potato strips thus prepared can be treated by dipping or briefly soaking them in an antioxidant solution, or spraying them with such a solution, to inhibit discoloration of the potato strips by oxidation on exposure to air for a prolonged period. The solution may be a $\frac{1}{2}\%$ to 1% by weight aqueous solution of sodium pyrophosphate ($Na_2H_2P_2O_7$), sodium bisulfite ($NaHSO_3$), citric acid or other known discoloration inhibitor. The treating solution also may include reducing sugar, if desired, to facilitate browning of the potato strips when being finally deep fat fried ready for consumption. The treating solution may be heated to a temperature of 130° F. to 180° F. (56° C. to 82° C.), and the potatoes may be subjected to the action of such a solution for a brief period within the range of 10 seconds to 25 seconds.

The potato strips then are subjected to heat at a temperature, for a time and under conditions which will partially cook and partially dehydrate the potato strips, such that the metabolic functions are deactivated, as evidenced by gelatinization of the starch. The affected potato material progresses toward a finely-granular condition in which the granules are easily separated. The potato strips are placed in an enclosure and hot air is circulated over their surfaces. The cooking and dehydrating operations can be performed as a batch process or as a continuous process, and the potato strips can be stationary or moved on a belt through a heated chamber.

The processing apparatus can be designated as a heating enclosure. The heating of the potato strips can be effected entirely by high velocity currents of air heated by a heat exchanger, or heating effected by the air can be supplemented by auxiliary heat sources such as infrared or microwave heaters. The degree and penetration of cooking will depend on the condition and variety of potato, the cross-sectional size and shape of the strips, the type or types of heat source or sources, the temperature, humidity and velocity of the heating air and the length of time that the strips are subjected to heating.

The first stage of heating is to remove surface moisture from the potato strips. The temperature of the initial air blown onto the strips may be within the range of 190° F. to 280° F. (88° C. to 138° C.), and preferably within the range of 250° F. to 280° F. (122° C. to 138° C.). The moisture content of the air should be less than 15% by weight so that the air currents will scavenge moisture readily from the surfaces of the potato strips in a period of 1 to 3 minutes. During such treatment, no appreciable moisture will be evaporated from the interiors of the potato strips.

During a second stage of heating, the potato strips are subjected to currents of hot humid air in the temperature range of 200° F. to 250° F. (94° C. to 122° C.), preferably within the range of 230° F. to 250° F. (110° C. to 122° C.), for a period of time sufficient to partially cook or gelatinize the strips and partially dehydrate them, in about three minutes to six minutes. The strips will be cooked to at least some degree close to the center but the outer portions of the strips will be cooked to a greater extent. Moisture evaporated from the potato strips tends to increase the humidity of the air as it is circulated. It is preferred that the moisture content of the air be within the range of 15% to 40% by weight. The recirculating air humidity is controlled so that the potato strips wll be dehydrated to the desired extent while simultaneously being partially cooked. Such humid air can penetrate more effectively into the potato strips to cook them. The partial cooking modifies the cell structure of the potato so that the metabolic functions are deactivated and the starch is gelatinized, resulting in a finely granular condition in which the granules are soft but not mushy and are easily separated. Such a texture is designated as "mealy".

The air moisture content can be regulated by controlling the amount of dry air admitted to the heating chamber and the amount of moist air discharged from the chamber. During the cooking-evaporating treatment, the moisture content of the potato strips will be reduced so that the partially cooked and partially dehydrated strips will have a weight of 85% to 90% of their original weight.

During a third stage of heating the potato strips are subjected to heat which will dehydrate them to a weight of 75% to 80% of their original weight. Such heating may be effected by comparatively dry hot air, such as having a moisture content less than 10% by weight, which may or may not be supplemented by infrared or microwave heating. During such dehydration step, much of the heating air is exhausted or dried to maintain the low moisture content specified. Such dehydrating operation may be accomplished in two to four minutes. More moisture will be removed from the outer portions of the potato strips than from the inner portions. The surfaces of the potato strips will be dry to the touch, and the edges and corners of the potato strips may be almost totally dehydrated. Such dehydration procedure will result in a shell or crust on final deep fat frying which will be crisp but tender and not leathery.

The potato strips that are subjected to the cooking-dehydrating operation discussed above have not previously been blanched with steam, have not previously been soaked in water and have not previously been cooked in water. The antioxidant treatment by spraying or dipping is of sufficiently short duration so that the potato strips do not absorb any substantial amount of moisture during such initial treatment. Consequently, it is not necessary for the heated air to remove from the potato strips any substantial amount of artificial moisture which they have acquired, but, on the contrary, during the cooking-dehydrating operation, it is almost entirely the natural moisture of the potato strips that is evaporated. Consequently, the drying-cooking-dehydrating operation is performed more rapidly, and by supplying less heat energy, than would be required if the potato strips had picked up any substantial amount of artificial moisture prior to or during the cooking operation.

Following the drying-cooking-dehydrating operation described above, the partially cooked and partially dehydrated potato strips can be allowed to cool briefly and then somewhat deep fat fried quickly, such as for a period of $\frac{1}{3}$ of a minute to 2 minutes, depending on the temperature of the cooking oil and the size of the potato strips and the desired solids contents of the strips. Preferably the cooking oil is within the temperature range of 325° F. to 390° F. (163° C. to 199° C.). This preliminary deep fat frying operation removes additional moisture from the potato strips, the amount removed depending on the size of the strips, the temperature of the cooking oil and the duration of the preliminary frying step.

The potato strips then are frozen in a conventional manner and held in frozen condition until they are ready to be prepared for consumption by being subjected to the final deep fat frying operation. Such final frying operation can be accomplished without first thawing the potato strips and within a period of 1½ minutes to 3 minutes if the cooking oil is at a temperature within the range of 340° F. to 380° F. (171° C. to 193° C.). The resulting French fried potato strips will have a crisp exterior without being leathery, will have a substantially homogeneous mealy interior and will be of golden brown color. Their flavor and odor will be as pleasant as those of raw potatoes which are French fried without ever having been frozen.

We claim:

1. The method of producing French fried potatoes which comprises dividing raw, unblanched potatoes into strips, heating the strips, thereby partially gelatinizing the strips substantially throughout, partially dehydrating the strips until the partially gelatinized and partially dehydrated strips weigh about 75% to 80% of their weight when raw and the cell structure is finely granular, parfrying the partially gelatinized and partially dehydrated strips, freezing the parfried strips, and thereafter finish frying the strips without the strips having been blanched.

2. The method of producing frozen potato strips for French frying which comprises dividing raw, unblanched potatoes into strips, circulating humid hot air over the surfaces of such strips in unblanched, substantially raw condition until the strips are partially dehydrated and partially gelatinized substantially throughout, weigh about 85% to 90% of their weight when raw and have a finely granular cell structure, circulating substantially dry hot air over surfaces of the strips until the strips are further partially dehydrated and their weight is about 75% to 80% of their weight when raw, and thereafter freezing the strips without the strips having been blanched.

3. In the method defined in claim 2, wherein the hot humid air has a temperature within the range of 230° F. to 250° F. (110° C. to 122° C.) and a moisture content within the range of about 15% to 40% by weight and is circulated for about 3 minutes to 6 minutes.

4. The method defined in claim 2 or 3, including parfrying the strips, after the strips have been further dehydrated and before the strips are frozen, in oil having a temperature within the range of 325° F. to 390° F. (163° C. to 199° C.) for about ⅓ minute to 2 minutes, without the strips having been blanched.

5. The method defined in claim 2 or 3, including, before partially dehydrating and partially gelatinizing the strips, removing moisture from surfaces of the strips without removing appreciable moisture from the interior of the strips by circulating over the strips hot air within the range of 190° F. to 280° F. (88° C. to 138° C.) and having a moisture content less than 15% by weight for about 1 minute to 3 minutes.

* * * * *